United States Patent [19]

O'Connor et al.

[11] Patent Number: 4,677,617
[45] Date of Patent: Jun. 30, 1987

[54] RAPID FREQUENCY-HOPPING TIME SYNCHRONIZATION

[75] Inventors: Roger J. O'Connor, Garden Grove; Keith A. Lane, Huntington Beach, both of Calif.

[73] Assignee: Hughes Aircraft Company, Los Angeles, Calif.

[21] Appl. No.: 784,284

[22] Filed: Oct. 4, 1985

[51] Int. Cl.[4] ........................ H04J 3/06; H04B 15/00; H04K 1/00
[52] U.S. Cl. ......................................... 370/100; 375/1
[58] Field of Search .............. 370/50, 100, 103, 110.1; 375/1, 115

[56] References Cited

U.S. PATENT DOCUMENTS

| 4,442,527 | 4/1984 | Munday | 375/1 |
| 4,532,635 | 2/1985 | Mangulis | 375/1 |
| 4,558,453 | 12/1985 | Mimken | 375/1 |
| 4,597,087 | 6/1986 | Kadin | 375/1 |

Primary Examiner—Douglas W. Olms
Assistant Examiner—Frank M. Scutch, III
Attorney, Agent, or Firm—Robert Thompson; A. W. Karambelas

[57] ABSTRACT

A method is disclosed for synchronizing the operation of frequency hopping, spread spectrum communication devices in a network. One device (the "NTU") is deemed to be keeping the network time, to which the other devices must synchronize in order to communicate over the network. In a broadcast mode of the method an unsynchronized unit (a "RTU") operates in an idle state to receive on a discrete set of receive frequencies. The total communication time period is divided into intervals, and a unique synchronization code is generated for each time interval which defines the idle state frequencies and time information transmit frequencies to be employed in accordance with the method. The time kept by the RTU is assumed to within a predetermined number of time interval of the present network time interval. In a broadcast mode the NTU transmits sequences of synchronization messages, each sequence including a message transmitted at a receive frequency for each of the past, present and future time intervals necessary to cover the time uncertainty time. This sequence is transmitted at a transmit hop rate substantially higher than the RTU receive hop rate, so that all possible receive frequencies and synchronization codes are bracketed by the transmission sequence. Each message include information enabling the RTU to predict the time and frequency at which network time information will be transmitted byt the NTU. The RTU receives one of the messages and tunes to the appropriate receive frequency to receive information enabling it to synchronize to the network time.

15 Claims, 15 Drawing Figures

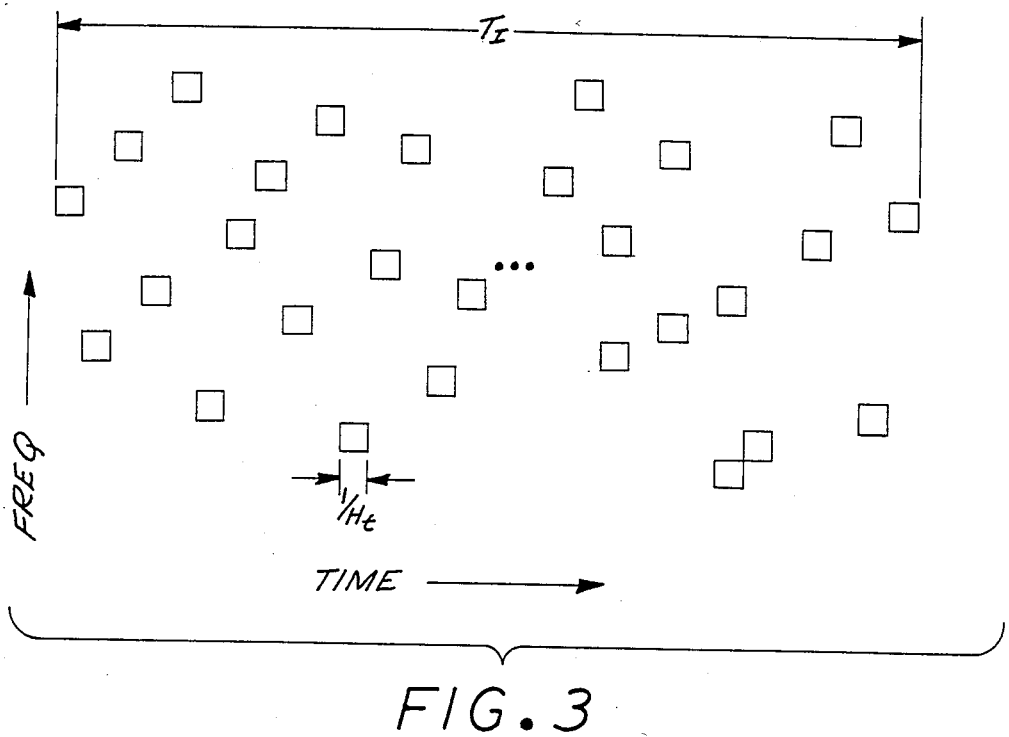
FIG. 3
FIG. 4
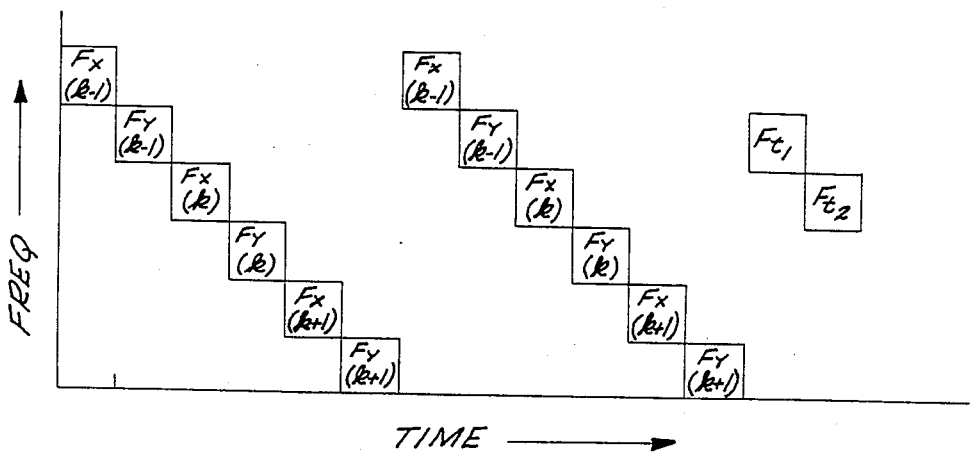

RAPID FREQUENCY-HOPPING TIME SYNCHRONIZATION

BACKGROUND OF THE INVENTION

The present invention relates to spread spectrum communication between two or more communication devices, and more particularly to time synchronization between such communication device.

Spread spectrum communication has been described as a means of communication in which the signal occupies a larger bandwidth than the minimum necessary to send the information. The spreading of the signal over the band is accomplished by means of a code which is independent of the communication information, and a synchronized reception with the code at the receiver is used for despreading and subsequent information recovery. *Theory of Spread-Spectrum Communications—A Tutorial,* R. L. Pickholtz, D. L. Schilling and L. R. Milstein, IEEE Trans. Commun., Vol. COM-30, pp. 855-884, May, 1982.

Networks of spread spectrum communications units employing frequency hopping may be employed for secure, anti-jam performance. In order for communication to occur between two (or more) such units, the operation of each unit must be timed synchronized to the operation of the other communicating unit(s).

The time synchronization has in the past been performed by one of several techniques. With one such technique, a synchronized unit transmits a synchronization signal that is long enough to allow an unsynchronized receiver to advance its internal time and compare the received signal to its internally generated synchronization signal. When the signals correlate, the unsynchronized receiver's internal time has been matched to that of the synchronized transmitter, and synchronization has been achieved.

In a second technique, a transmitted synchronization signal is received by an unsynchronized unit, which monitors simultaneously a number of frequencies thereby covering a span of time. The number of frequencies that must be monitored is dependent upon the time inaccuracy which must be resolved. The signal received on each frequency monitored is compared against an internally generated synchronization signal and the monitored frequency which achieves the proper correlation between its signal and the transmitted signal has the correct time.

With another technique, the network has a lower performance mode that is used for network entry. Under certain conditions, such as if heavy jamming is experienced, the network entry waveforms are repeated many times to ensure unsynchronized unit network entry.

With another approach, the synchronization waveforms are "hidden" within network communications. Unsynchronized units monitor network communications and synchronization is achieved afer a sufficient number of these "hidden" transmissions are received.

It would represent an advance over the art to provide a time synchronization technique for spread spectrum, frequency hopping communication devices which would allow unsynchronized units to request network entry, provide relatively short synchronization transmissions covering relatively large time uncertainties, employ one standard synchronization transmission supporting multiple network entry methods, and provide a synchronization waveform which can be made to look identical to typical network communication transmissions.

It would further be advantageous to provide a time synchronization technique for a network of frequency-hopping communication devices which does not require special network entry receiving or transmitting equipment.

SUMMARY OF THE INVENTION

The invention comprises a method and apparatus for synchronizing the operation of frequency hopping communication devices in a network, each device with its respective clock. In accordance with the invention, one network device, the "network time unit" ("NTU"), is deemed to keep the network time to which all the devices in the network must synchronize in order to be able to communicate over the network. The communication time over which the network is to operate is divided into time intervals, and each device has a code generator for generating a unique synchronization code word for each interval in the total period. Each code word in turn defines several network parameters, including idle state receive frequenies, correlation words and transmit frequencies used to send network time information, all for the respective time interval. The relative time kept by each network device is assumed to be within a predetermined number of time intervals of the network time, defining a relative time uncertainty.

In a broadcast mode of the invention, an unsynchronized network unit keeping its own relative time, a "relative time unit" ("RTU"), operates in an idle state to receive on a frequency-hopping, discrete set of receive frequencies defined by the unique code. During the idle state, the RTU operation dwells on each receive frequency for a dwell time determined by the hop rate. The NTU transmits sequences of synchronization messages at a transmit hop rate substantaeilly higher than the receive hop rate. The invention exploits the fact that the RTU relatve time will be within a predetermined number of time intervals of the present interval of the network time. The sequences of transmitted messages includes a transmission at each possible receive frequency, as deifned by the synchronization code for the present network time interval as well as the codes for a number of past and future time intervals which bracket the current network time interval to the extent necessary to cover the time uncertainty. The sequence is transmitted a second time to cover all possible hop transition states that may occur within the possible time uncertainty.

Each synchronization message includes a time correlation word and a protocol message identifying whether the particular message occurs in the first or second sequence, and the relation of the particular synchronization code employed to the present network time interval. Immediately following the end of the second sequence transmission, the NUT transmits a pair of network time messages which define the current network time interval and subinterval.

Each network device includes a correlator device for correlating any received signal with the respective time and communication correlation words defined by the current synchronization code. If correlation is achieved with the time correlation word, the RTU decodes the protocol word to predict the time of transmission of the network time messages and the transmission frequency. The RTU may then receive and decode the network time messages to adjust its clock into synchronization with the network time. If correlation is achieved with a communication correlation word by a network unit which has been synchronized with network time (NU), then the NU commences frequency hopping communication.

In a demand mode, the sequence of synchronization messages can be transmitted by an RTU; and the NTU, operating in the idle state, receives a message, interprets it to determine the time and frequency at which the RTU expects to receive network time transmissions and provides such transmissions at the expected time and frequency. In a passive mode, one RTU may receive a synchronization transmission from a third party RTU operating in the demand mode, and thereafter receive the network time information transmission from the NTU.

BRIEF DESCRIPTION OF THE DRAWINGS

These and other features and advantages of the present invention will become more apparent from the following detailed description of an exemplary embodiment thereof, as illustated in the accompanying drawings, in which:

FIG. 3 is a frequency-time chart illustrating the operation of a network unit at the transmit hop rate.

FIG. 4 is a frequency-time chart illustrating the transmission of sequences of synchronization messages in accordance with the invention.

DETAILED DESCRIPTION OF THE DISCLOSURE

A rapid frequency-hopping time synchronization technique in accordance with the present invention employs a fixed time interval. Each time interval establishes a starting point for all frequency-hopping sequences. In each time interval a new synchronization code $C_k$ is generated for use in that interval. For example, if a total time period is covered such as T hours, then the number N of time intervals is 3600 T seconds divided by the durartion $T_i$ of the inteval, or $N=3600\ T/T_i$. Thus N is the total number of intervals during the time period T. Since a synchronization code $C_k$ is generated during each interval there are also N codes for each time period.

Each time interval can be further divided into arbitrarily small subintervals ($T_a$) in accordance with the invention. The size of $T_a$ is determined by the time accuracy requirements of the frequency hopping network. This subinterval $T_a$ is equal to $T_i/M$, where M is the number of subintervals required to fill the time interval duration $T_i$. The transmit hop rate ($H_t$) on each frequency defines the frequency hopping network capability against jamming. Using these defined parameters of a frequency-hopping network, the invention may be used to synchronize an unsynchronized unit with the network time while maintaining the network's performance against surveillance or against disturbances such as jamming.

Figure 1:
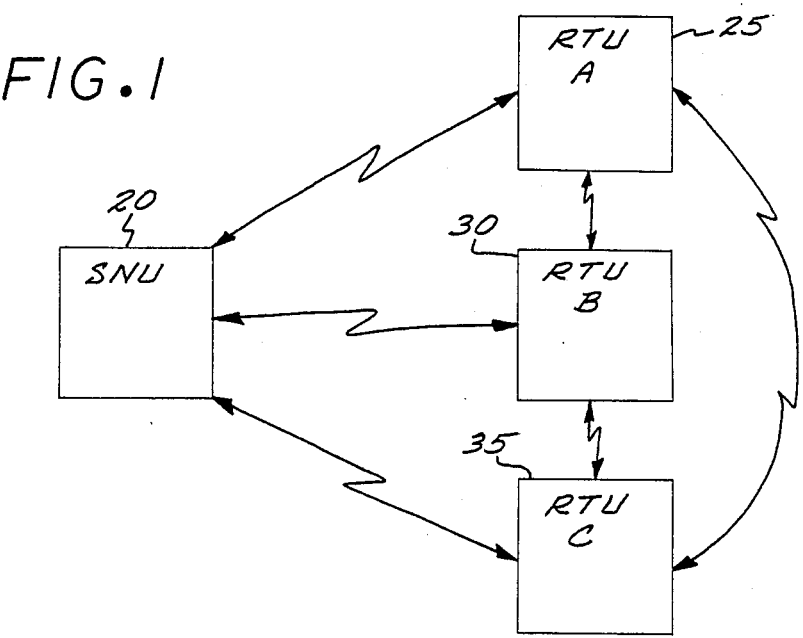
FIG. 1. is simplified schematic drawing illustrative of a network of frequency hopping communication devices which may employ the invention.

The invention may be employed in several different modes to achieve time synchronization between frequency hopping network communication units. The first mode to be discussed will be referred to as the "broadcast" mode, wherein the network unit assumed to be keeping the correct network time (the "network time unit" or "NTU") transmits a synchronization request to the unsynchronized network unit keeping its own relative time (a "relative time unit" or "RTU"). A typical network of frequency hopping devices is illustrated in FIG. 1, comprising NTU 20 and RTUs 25, 30, 35. A primary purpose of the invention is to provide a technique for rapid time synchronization of the relative times kept by the respective clocks of the RTUs to the network time kept by the clock of the NTU.

Figure 5A:
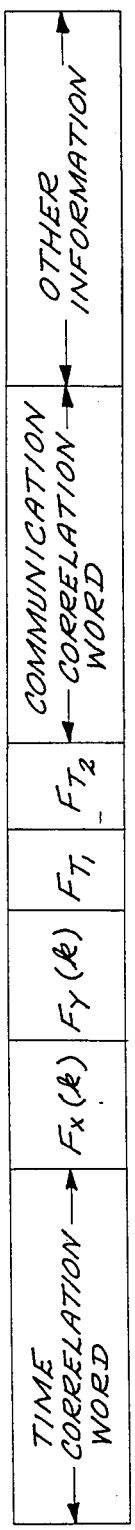
FIGS. 5a-5d are respective representations of a synchronization code word, a synchronization message and respective network time messages as employed in the disclosed embodiment of the invention.

In accordance with the invention, synchronization is established between a particular RTU and the NTU in the following manner. In each time interval, the synchronization code $C_k$ is generated and stored at the NTU and the respective RTUs. Depending on the application, the code $C_k$ may comprise a long sequence of digital bits, for example, a sequence of two thousand bits. This code determines a specific set of frequencies and correlation words which will be valid during that interval. For example, the sequence of bits comprising the respective code $C_k$ may be divided into regions by a predetermined scheme, wherein the bits in the first region define time correlation word, the bits in the second region define a frequency $F_x(k)$, the bits in the third region define a frequency $F_y(k)$, the bits in the fourth region define a frequency $F_{t1}$, the bits in the fifth region define a frequency $F_{t2}$, and the bits in the sixth region define a communication correlation word. Such a scheme is illustrated in FIG. 5a.

As will be appreciated by those skilled in the art, the NTU and the RTUs are all adapted to generate codes $C_k$ in accordance with some predetermined arithmetic process, for example, by pseudorandom number generation wherein a time value comprises a parameter. That is to say, the synchronization codes are known a priori at the respective NTU and RTUs comprising the frequency hopping network of the process. Each code $C_k$ is unique since the psuedo random number generator has a different initial state which is defined by the interval value N. Because these codes change as a function of the respective time interval, reliable information communication between the respective devices is not achieved until the operation of the respective units are synchronized in time. The invention prices an advantageous technique of achieving such time synchronization.

In the "broadcast" mode, the RTU is assumed to be operating in an "idle" state. A set of two receive frequencies $F_x(k)$ and $F_y(k)$ is employed during a respective kth time interval by the RTU, with the RTU alternately receiving on frequencies $F_x(k)$ and $F_y(k)$ at the receive hop rate ($H_r$).

Figure 2:
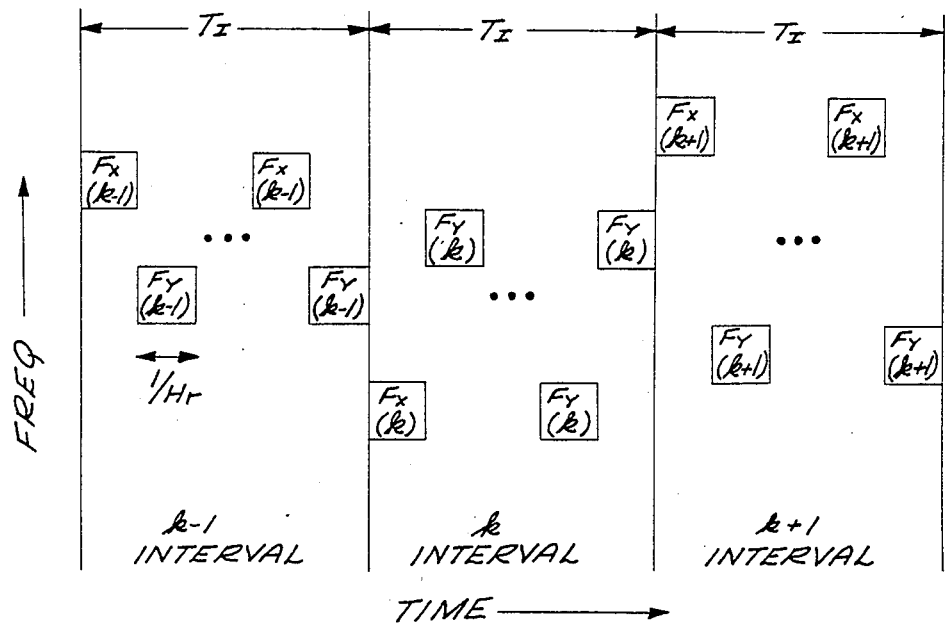
FIG. 2 is a frequency-time chart illustrating the operation of a network unit operating in the "idle state" in accordance with the invention.

FIG. 2 illustrates the operation of the RTU during the idle state. Thus, in the (k−1)th interval, the RTU alternately receives on frequencies $F_x(k-1)$ and $F_y(k-1)$. In the kth interval, the RTU alternately receives on frequencies $F_x(k)$ and $F_y(k)$. In the (k+1)th interval, the RTU alternately recieves on frequencies $F_x(k+1)$ and $F_y(k+1)$. This process continues as long as the RTU remains in the idle state. Every $T_i$ seconds, the RTU generates a new synchronization code $C_k$ in accordance with the N value established by its relative time, which define new frequencies for $F_x(k)$ and $F_y(k)$.

While in the idle state, the RTU demodulates any received signal into a digital data sequence, and compares the demodulated data against a pair of stored or calculated correlation words comprising the code $C_k$. If the time correlation word is recognized, then a synchronization process is commenced, as will be described below. The information required for the start of RTU synchronization must be transmitted on $F_x(k)$ or $F_y(k)$, since the RTU alternately receives on these two frequencies.

The disclosed embodoment of the invention is adapted to synchronize units which may have a maximum time uncertainty of plus or minus one time interval, although the invention is not so limited. Thus, synchronization will be achieved if the relative time kept by a RTU is within one time interval of the current network time interval. The relative time kept by a RTU can be characterized, in a coarse sense, as being in the past, present or future interval relative to the current network time interval. The immediately preceding interval is the "past interval," the current time interval is the "present invterval," and the next successive time interval is the "future interval."

Since the RTU in the idle state alternately receives on two frequencies in a respective Kth time interval, and since the maximum time uncertainty is within plus or minus one time interval of the present network time interval, then the instantaneous RTU receive frequency is known by the NTU to be one of six frequencies. For the Kth interval (network time), the six frequencies are those illutrated in FIG. 2 as $F_x(k-1)$, $F_y(k-1)$, $F_x(k)$, $F_y(k)$, $F_x(k+1)$, $F_y(k+1)$ for the three respective time intervals k−1, k and k+1.

FIG. 3 is a frequency-time graph depicting the transmit hop rate ($H_t$) employed by network units in accordance with the invention. As illustrated, a network unit transmits a sequence of messages at a plurality of predetermined frequencies, with the transmit frequency hopping from one frequency to the next at the transmit hop rate. In accordance with the invention, all transmit operations by network units occur at the transmit hop rate.

To initiate synchronization in the broadcast mode, the NTU transmits two sequences of synchronization messages to the RTU, employing each of the respective frequencies at which the RTU is known to be operating during the idle state in the three pertinent time intervals, the past (k−1) interval, the present (k) interval, and the future (k+1) interval. This transmit operation of the NTU is depicted in FIG. 4, in which frequencies $F_x(k-1)$, $F_y(k-1)$ correspond to the RTU receive frequencies for the past interval, frequencies $F_x(k)$, $F_y(k)$ correspond to the RTU receive frequencies for the present interval, and frequencies $F_x(k+1)$, $F_y(k+1)$ correspond to the RTU receive frequencies for the future interval.

The time duration of each synchronization message is $1/H_t$. In accordance with the invention, the transmit hop rate ($H_t$) is determined by a tradeoff between synchronization parameters such as the data rate, length of synchronization transmission, probability of reception, probability of false synchronization and network interval accuracy. The transmit hop rate ($H_t$) is also used for network communication.

As illustrated in FIG. 4, the sequence of six synchronization messages transmitted over the six frequencies is repeated to ensure correlation on one frequency by the RTU. The receive hop rate is a function of the transmit hop rate, as defined by Eq. 1 set forth hereinbelow. Because of the inherent ambiguity that exists because the RTU may hop from one receive frequency to the next during a synchronization transmission sequence, the redundant sequence is employed to ensure that one message will be received.

Figure 5B:
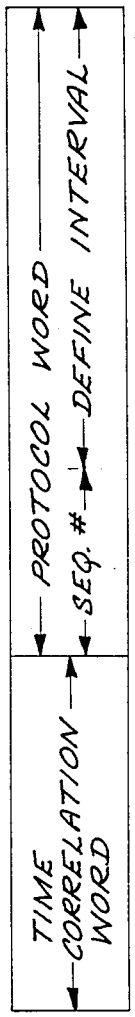

Referring to FIG. 5b, the content of a representative synchronization message transmitted by the NTU is depicted. Each message is a sequence of digital bits and comprises a correlation word, and a protocol word defining whether the particular message is in the first or second sequence of transmissions, and whether the transmit frequency and time correlation word are defined by the synchronization code for the past, present or future time interval in relation to the network time.

During each RTU receive dwell time on each idle state frequency, any signal received at the current receive frequency is demodulated into a digital bit stream, which is compared against the time correlation word comprising the synchronization code corresponding to the particular RTU interval. If correlation is achieved, the protocol word comprising the synchronization message can be used by the RTU to initiate the synchronization of its time clock to the network time.

In this particular embodiment of the invention, there are two conditions which must occur before the RTU may commence synchronization. The NTU must broadcast on a frequency at which the RTU is currently dwelling, and if this occurs, the broadcast information must include a synchronization message which time correlates to a stored or calculated correlation word at the RTU. These two conditions are achieved in accordance with the present invention, since the set of possible RTU receive frequencies and the corresponding stored correlation words for a particular kth time interval are known a priori at the NTU, and the transmit hop rate is higher than the RTU receiver hop rate, so that the receive dwell time is longer than the transmit dwell time, Thus, at some time during the sequences of transmitted synchronization messages, there will occur a correspondence in the receive and transmit frequencies.

Each message transmitted by the NTU at each frequency includes, in addition to the respective correlation word used for correlation in the RTU, a protocol word which defines whether the transmit frequency and correlation word is defined by the synchronization code $C_k$ for the past, present or future time interval of the network time. The RTU may decode a received message and protocol word to determine wheterh its relative time is in the past, present or future interval in relation to the network time. The protocol word also includes data defining the relative location of the particular received information in the sequence of transmitted synchronization messages at the respective frequencies.

This information may simply fix whether the received information is in the first or second sequence of messages illustrated in FIG. 3, since the sequence order of six frequencies is known a priori at the RTU receiver. FIG. 5b illustrates the content of a typical synchronization message.

Figure 5C:
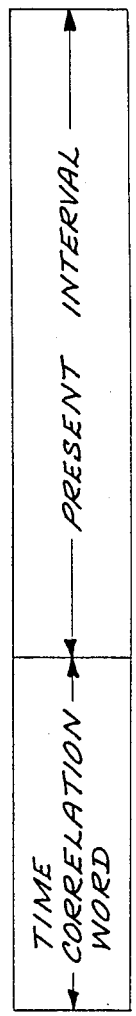
Figure 5D:
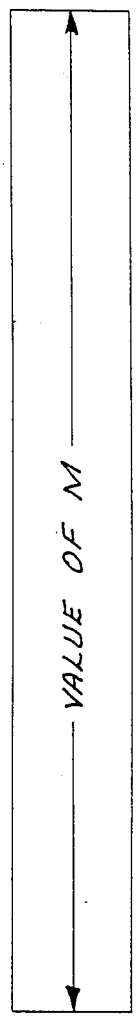

Immediately following the sequences of synchronization messasges, the NTU transmits network time messages at two additional frequencies $F_{t1}$, $F_{t2}$. The first message at frequency $F_{t1}$ comprises the correlation word to be correlated by the RTU as in the prior synchronization messages. The first message also contains the information that the frequency $F_{t1}$ is defined by the synchronization code for the present interval of the network time. The second message at frequency $F_{t2}$ (defined by the same synchronization code word) comprises data defining the value of M to which the RTU subinterval timer is to be set to synchronize to the network time. The contents of the first and network time messages is illustrated in respective FIGS. 5c and 5d.

Because the synchronization message which was received and correlated by the RTU included a protocol word with the information described above, the RTU is provided with sufficient information to predict the time and frequency $F_{t1}$, at which the first network message will be transmitted. The RTU decodes the protocol word to predict the time and frequency at which the network time transmission will be broadcast and then receives this transmission.

Upon receipt of the information transmitted on the frequencies $F_{t1}$ and $F_{t2}$, the RTU adjusts its time to the present interval of the NTU and to the appropriate value of M defining the present subinterval of the network time. Typically the transmitted value of M is referenced to some future subinterval a predetermined time later to provide the RTU with time to process the information and update its time. For example, the value transmitted for M may be 600, but the RTU sets its M timer to 700 to account for the processing time delay between the time at which the NTU M timer is read and the time the RTU M timer is updated. This processing will be readily apparent to those skilled in the art. The RTU is then synchronized with the network time and may communicate with other synchronized units comprising the network.

A second mode of operation is the "demand" mode, whereby an RTU can request that network time information be transmitted by the NTU. In this mode, a RTU sends a sequence of synchronization request messages to be received by the NTU. The NTU is assumed to be operating in the idle state alternatively receiving at the idle state frequencies $F_x(k)$, $F_y(k)$ defined by the current interval synchronization code, as described above.

Since the relative time kept by the RTU is not sufficiently accurate to determine the present network time interval and, therefore, the correct synchronization code $C_k$ defining the instantaneous receive frequency of the NTU, the RTU generates codes $C_k$ for the past, present and future time intervals, i.e., the $(k-1)$, $(k)$ and $(k+1)$ intervals, and determines the appropriate idle state frequencies for each interval. The RTU transmits synchronization messages on each frequency $F_x(k)$ and $F_y(k)$ for the three intervals, in a manner similar to the NTU transmission sequences discussed above for the broadcast mode (FIG. 4).

Each synchronization request message comprises the respective time correlation word and a protocol word which defines whether a particular transmission is in the first or second sequence of transmissions and whether the code $C_k$ employed for that transmission is for the past, present or future relative time interval. Thus, in order to cover the possible time uncertainty between its relative time and the network time, the RTU sends synchronization transmissions corresponding to the code $C_k$ for each of the possible network time intervals, covering in one sequence of synchronization transmissions the three possible sets of synchronization codes and corresponding idle state frequencies $F_x(k)$, $F_y(k)$. This information is all referenced to the relative time kept by the RTU.

One of the synchronization request tranmissions will alert the NUT that a synchronization transmission request has occurred. This alert can occur if only one of the multiple synchronization transmissions occurred on the correct frequency $F_x(k)$ or $F_y(k)$ at which the NTU was then receiving. Since each transmission in each sequence identifies the transmission as for the past, present or future relative time interval, the NTU has sufficient information to determine that synchronization code $C_k$ which corresponds to the requesting RTU's present time interval.

The NTU responds to the RTU request immediately following the RTU's transmission sequences by transmission of the two network time messages at the frequencies $F_{t1}$, $F_{t2}$. The same type of information is transmitted by the NTU as was described above for the broadcast mode with respect to FIGS. 5c and 5d. The RTU decodes this information and adjusts its time to correspond to the NTU time interval $T_i$ and subinterval $T_a$. The first message is transmitted at the transmit frequency $F_{t1}$ defined by the synchronization code for the relative present time interval of the RTU. However, the second message is transmitted at the frequency $F_{t2}$ defined by the code for the present network time interval, since the first message provided information for the RTU to adjust its relative interval to the present network interval.

The third mode of operation is the "passive" mode. In this mode, a passive RTU operating in the idle state receives and correlates a synchronization request transmitted by a third party RTU, i.e., via the demand mode. The passive RTU then prepares for and receives the network time response transmitted by the NTU and synchronizes its time to the network time as described above with respect to the demand mode. In effect, the passive mode is a combination of the broadcast and demand modes. The passive RTU need not distinguish between the third party's synchronization requests in the demand mode or the NUT's synchronization sequences in the broadcast mode.

While the invention has been described in the context of a particular embodiment wherein the maximum time uncertainty between the RTUs and the NTU is plus or minus one time interval, the invention is not so limited. The method may be extended to an arbitrarily long time uncertainty covering two or more intervals by increasing the number of idle state receive frequencies to the number of idle state frequencies for all possible time intervals. The resulting tradeoff is an increase in the time required to obtain synchronization.

For the general case of the invention, the receive hop rate is related to the transmit hop rate by the following equation 1.

$$H_r \leq H_t/(4I+1) \tag{1}$$

where I represents the maximum relative time interval offset from the present network time interval.

For the above described embodiment, I=1, and the maximum hop rate is $H_t/5$ in accordance with Eq. 1.

The length $S_t$ of the transmissions required for synchronization of an RTU is defined by the following Equation 2.

$$S_t \geq (8\ I+6)/H_t \qquad (2)$$

In accordance with the invention, the minimum duration ($T_i$) of the interval must be $S_t/2$, but can be arbitrarily long. The number $N_f$ of frequencies at which synchronization messages must be transmitted is set forth by Equation 3.

$$N_f = 4I+2 \qquad (3)$$

By way of example, if the maximum timer uncertainty is plus or minus two time intervals, then each sequence of synchronization messages includes transmissions at ten idle state frequencies. If the transmit hop rate is unchanged from the example described above, then the time required for synchronization increases correspondingly.

Communication capability by a number of network units (NU) which have entered the network is maintained by use of the idle state, but when a communication correlation word is sent by one network unit, this word may be correlated by all the units which have entered the network. When this word is received, the network units will prepare for reception of the message by the transmitting network unit. It should be noted that the same transmit hop rate ($H_t$) is maintained during synchronization as well as during NU to NU communications. The receive network hop rate ($H_r$) can be made significantly slower than the transmit hop rate ($H_t$) but the transmit hop rate ($H_t$) is always maintained at the network hop rate. In addition, the synchronization transmissions and the communications transmissions can be made to appear identical, thus concealing the fact that a network entry is in progress. In addition, if concealing the network entry is not a requirement, the network entry methods can also be used to support entry into networks that hop at a much faster rate. This faster hop rate is dependent only upon the subinterval value M, since every NU's relative time is as accurate as the M value received.

To initiate communication, a synchronized device transmits a pair of transmission sequences. Each transmission in the sequence is at the appropriate idle state frequency and includes the communication correlation word and a communication protocol word defining whether a particular transmission is in the first or second sequence. This allows the receiving unit to predict the time at which communication transmission will commence, i.e., immediately following the end of the second sequence. Redundant sequences are transmitted to increase the probability of reception, which may be affected by phenomenon such as fading and jamming. However, the network can also be operated with shorter communication synchronization preambles, since the time uncertainty has been reduced by the network entry process. The communication transmissions occur at frequencies which are known a priori at all network units because the PN sequence initial value is determined by the interval value N and subinterval value M. Each communication message ends with an "end of message" identifier or code which is decoded by the receiving units and signals that the message is complete.

Figure 6:
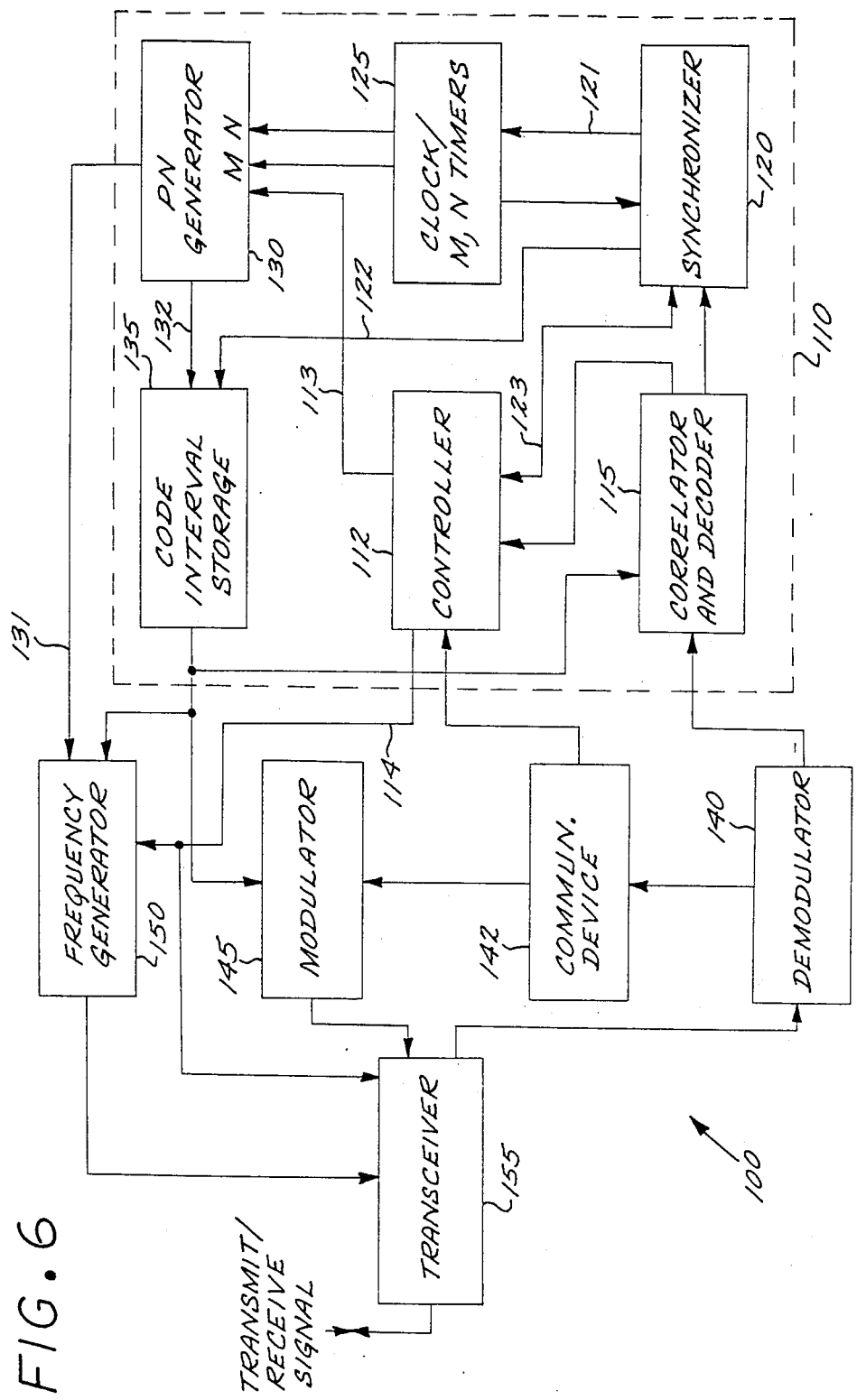
FIG. 6 is a block diagram of a frequency hopping network unit in accordance with the invention.

A block diagram of a network unit (NU) as may be employed in accordance with the invention is illustrated in FIG. 6. The NU 100 comprises a transceiver 155, a frequency generator 150, modulator 145 and demodulator 140, all conventional devices as employed in conventional frequency hopping communication devices and well known to those skilled in the art. Briefly, the transceiver 155 operates as a frequency translator, translating the frequency of signals received at an rf frequency defined by a receive frequency control signal provided by generator 150, down to baseband levels for processing by the demodulator 140. The transceiver 155 translates the frequency of modulated signals provided by the modulator 146 up to an rf frequency defined by transmit frequency control signals provided by the generator 150.

The demodulator 140 receives the baseband signal from the transceiver 155 and demodulates this analog signal into a sequence of binary valued signals. The modulator 145 is adapted to provide an analog signal to the transceiver 155 which is modulated in accordance with digital signals provided from the digital processor 110 or the communication device 142.

Frequency generator 150 is adapted to process frequency signals $C_k$ received from the processor 110 into the transmit frequency and receive frequency control signals provided to the transceiver 155 which determines the receive/transmit mode and frequency on which the transceiver 155 is to operate.

Communication device 142 depicts a communication device which generates information data to be processed by modulator 145 or which receives information data from the demodulator 140 when the network unit 100 is operating in a communication mode. The particular type of utilization device, whether an analog or digital device, forms no part of the present invention, and will not be described in further detail.

The digital processor 110 comprises controller 112, correlator/decoder 115, synchronizer 120, clock 125, PN generator 130 and code interval storage element 135 and controller 112.

The correlator/decoder element 115 performs the conventional function of comparing a sequence of digital signals received from the demodulator 140 against stored sequences of digital values provided by the code interval storage element 135. The element 115 is adapted to simultaneously perform a first correlation between the received data sequence and the time correlation word and a second correlation between the received data sequence and the communication word. As is well known to those skilled in the art, the correlation is a high speed process to determine a match between the bits of received data and the respective correlation word. In the disclosed embodiment, each correlation process is conducted twice per bit, i.e., the correlator operates at twice the data rate. If correlation is achieved, the correlator/decoder 115 provides a correlation signal to the synchronizer element 120 and to the controller 112, indicating whether time or communication word correlation has been achieved.

In the event that correlation for the time correlation word is achieved, the subsequent data comprises the protocol word in the case of a synchronization transmission in a sequence, or the pertinent time interval and the number M defining the appropriate subinterval $T_a$ in the case of network time transmissions. This data is provided to the synchronizer 120 with the time correlation signal by the correlator/decoder 115. The synchronizer 120 processes this data to determine how the clock 125 is to be controlled via a control signal on line 121 to achieve synchronization. For example, the synchronizer 120 may instruct the clock 125 to advance or retard its interval state by one time interval or to adjust to a particular subinterval within the determined time interval.

The clock element 125 keeps the network unit time. The particular form of the clock element will depend on the particular application for the network unit. For many applications it will be useful to provide a clock element which functions as a real time clock to provide real time information. The clock element preferably includes respective interval and subinterval resettable timers for counting the elapsed intervals N and the M subintervals within each interval. The clock device provides an initial state signal to the PN generator 130 indicative of the interval value N. The operation of such a clock will be described in further detail hereinbelow with respect to FIG. 7d.

For an application in which the real time is unnecessary, the clock 125 may comprise, by way of example only, a digital counter for counting the number of elapsed intervals from a start time within a resolution $T_a$. Other embodiments for performing the function of clock 125 may be readily apparent to those skilled in the art.

The PN generator 130 is a pseudo random number generator device for generating a sequence of numbers or bits defining the synchronization code $C_k$, as determined by a predetermined arithmetic process that is satisfactorily random for the purpose. The same process is employed by all NUs in the network. One parameter in the arithmetic process is the relative time interval state kept by the NU, i.e., the initial state value N kept by the clock 125. Thus, for synchronization the N initial state value determines the code generated by the PN generator 130. For communication, the clock 125 also provides the M value to the PN generator 130, causing the generator to generate a communication bit sequence, which is a function of the current M and N values for the NU. baThis sequence if provided to the frequency generator 150 on line 131 and determines the communication hop frequencies. Thus, the PN generator is seeded or initialized by the values for M and N at the beginning of each interval. If a communication starts within an interval, the initial state for the PN generator is based upon the values M and N at that time. Once the PN generator has been seeded, the actual PN generator operation is conventional.

The code interval storage element 135 is coupled to generator 130 via line 132 and comprises a random access memory unit for storing the respective synchronization codes generated for each of the past, present and future time intervals. The output address of the memory 135 is controlled by synchronizer element 120, which determines which of the stored codes is to be provided as an output modulator 145 and the correlator/decoder 115.

Controller 112 comprises the central control unit for the digital processor 110. The controller 112 interfaces with the communication device 142, and provides the communication signal to the PN generator 130 for seeding the PN generator with the current M and N values to allow frequency hopping communication to occur once synchronization has been achieved. The correlator and decoder 115 provides a communication correlation signal to the controller 112 when correlation has been achieved with a received signal and the communication correlation word. The controller 112 then instructs the communication device 142 that a burst of communication data will subsequently be received, allowing the device 142 to monitor and process the data. If the device 142 wishes to transmit communications data, it so notifies the controller 112. For reception or transmission of communication message, the controller 112 issues a communication signal to the PN generator 130, causing the PN generator to initiate operation at the start point defined by the current M and M values. The PN sequence defining the communication frequencies is supplied directly to frequency generator 150 on line 131.

From the foregoing, it will be apparent that the frequency generator is adapted to decode the respective synchronization and communication codes provided by the memory 135 or the PN generator 130, and to provide to the transceiver 155 the appropriate receive and/or transmit control signal. Such signal controls the transceiver frequency.

While each of the elements comprising the digital processor 110 have been described as separate elements, it will be apparent to those skilled in the art that processor 110 may be implemented as a plurality of discrete digital devices including, e.g., microprocessors, counters, random access memory devices and the like, or as a single processor device configured to perform the functions of the respective elements.

Figure 7A:
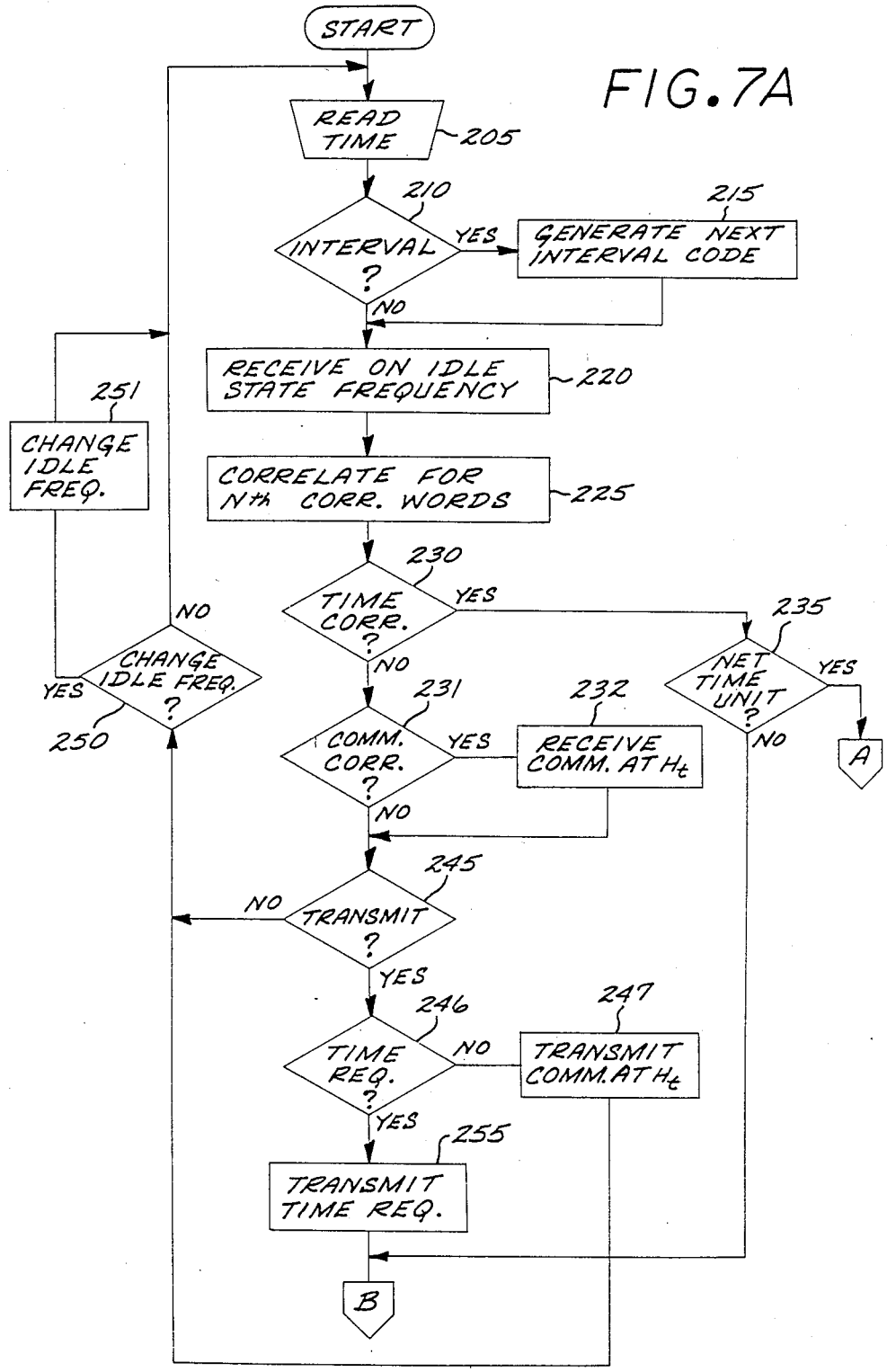
FIGS. 7a-7d are flow charts illustrative of the operation of a network device employing the present invention to achieve network time synchronization.
Figure 7B:
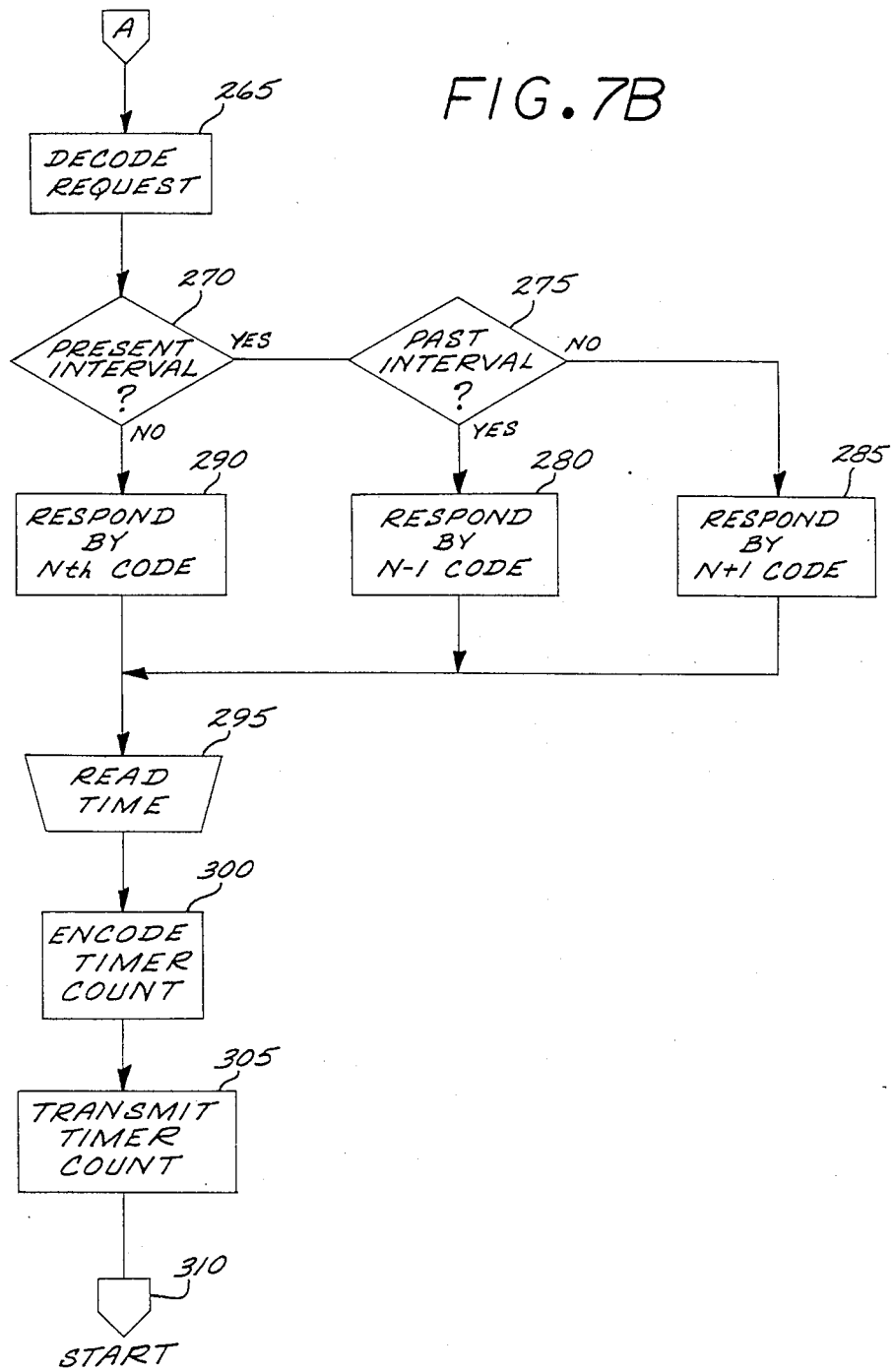
Figure 7C:
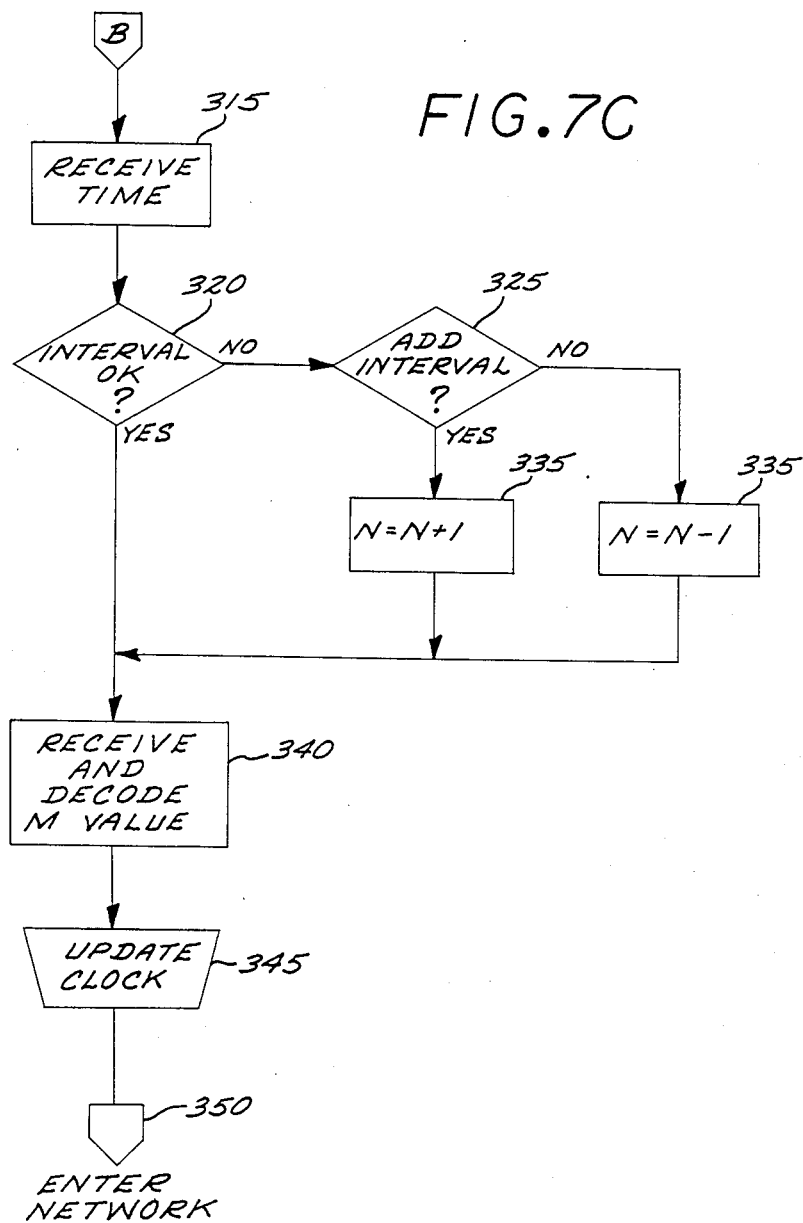

Referring now to FIGS. 7a-7c, a general flow chart is set forth illustrating the operation of a network unit in accordance with the invention. The flow chart illustrates all three modes of operation described hereinabove. At step 205 (FIG. 7a), the clock of the network unit is read to determine the relative unit time. At decision point 210, the unit determines if, based on the unit time, an interval transition has elapsed since the last time the clock was read, i.e., whether a transition has occurred from one interval to the next. If the decision is affirmative, then at step 215 the PN generator is operated to generate the code $C_k$ for the new interval.

At step 220, the unit transceiver is tuned for receive operation at a first receive idle state frequency defined by the code $C_k$. At step 225 a correlation is performed between any message received at the idle state frequency and the respective time and communication correlation words comprising the code $C_k$.

At decision point 230 a decision is performed to determine whether a correlation has been achieved with the time correlation word. While the correlation decision may be based on correlation on a single synchronization message, the reliability of the decision may be improved by obtaining correlation on a plurlaity of messages. For example, once correlation is achieved on a message, the RTU may predict the frequencies of the next message in the sequence and receive on this frequency at the transmit hop rate, i.e., tracking the transmission sequence. If correlation is achieved on the succeeding message, then the probability that the RTU has correlated on noise is exceedingly low. This process can be extended to cover any number of decoding sequences.

If the decision at point 230 is affirmative, the operation branches to decision point 235 to determine whether the network unit is the unit keeping the network time. If this decision is affirmative, then the operation branches to the subroutine commencing at point A (FIG. 7b) to transmit the network time messages. If the decision at point 235 is negative, then the operation branches to point B (FIG. 7c) to receive network time messages.

If the correlation decision at step 230 is negative, then at decision point 235 a decision is performed to determine whether correlation has been achieved with the communication correlation word. If the decision is affirmative, then at step 232 the network unit receives communications signals at the transmit hop rate and the frequencies defined by the communication code generated by the PN generator 130. Reception occurs until an "end of message" identifier is received.

If the decision at point 231 is negative, then at step 245 the unit determines whether to transmit. If the decision is negative, then operation branches to step 250. If the decision is affirmative, then at decision point 246 a decision is made to determine whether a time request is to be transmitted, i.e., whether to employ the "demand" mode. If the decision is negative, then at step 247 the unit transmits a communication message at the transmit hop rate $H_t$ at the frequencies established by the communication code generated by the PN generator. Once the message(s) has been transmitted, the operation branches to point 250.

At decision point 250, a decision is made to determine whether the idle frequency should be changed, i.e., whether the receive dwell time has elapsed since commencing reception on the first receive frequency. If so, the idle state frequency is changed at step 251 and operation returns to step 205. If the decision at point 246 is to request a network time transmission, then at step 255 the unit transmits the two sequences of synchronization messages. As described above (e.g., FIG. 4), each sequence includes six messages transmitted at the respective idle state frequencies. After transmission of the time request messages, the operation branches to point B (FIG. 7c) to receive the network time transmissions.

Referring now to FIG. 7b, the subroutine for transmitting the network time is illustrated. At step 265 the synchronization request message is decoded to determine the relative time interval in which the request was made. At decision point 270, if the decoding result is that the relative time is in the present network interval, then at step 290 the NU responds by transmitting the first network time message (FIG. 5c) employing the present interval code, advising the requesting unit that its relative time interval is correct. If the decision at point 270 is negative, then another decision is made at point 275 for the past interval. If the requesting unit's relative time is in the past relative to network time, than at step 280 the NU transmits the first time information message using the synchronization code for the past (k−1) interval. If the decision at point 275 is negative, then the only remaining state is that the requesting unit's time is in the future (k+1) network interval, and the NU transmits the first time message using the synchronization code for the future time interval.

At step 295 the NU reads its timer to determine the M count. The timer count is encoded into an 80 bit message at step 300, and at step 305 the second network time message (FIG. 5d) is transmitted using the code (and transmission frequency) specified for the network time present interval. Operation for the network time unit then returns to step 205 (FIG. 7a).

Referring now to FIG. 7c, the operation of a unit receiving network time messages is illustrated. Operation has branched to step 315 from step 255 (FIG. 7a). At step 315 the unit receives the first time message at the expected frequency and time, as discussed above. At step 320 the time message is decoded to determine whether the receiving unit's relative time interval corresponds to the network time interval. If the decision is affirmative, then the operation proceeds directly to step 340. If the relative time interval does not correspond to the network time interval, at decision point 325 the unit determines whether its interval should be incremented to correspond to the network interval. If so, the unit increments its interval clock at step 300 and then proceeds to step 340. Otherwise, the unit's interval clock is decremented at step 335 and operation proceeds to step 340.

At step 340 the unit receives the second network time transmission at the appropriate frequency specified by the code for the present interval and decodes the M value. At step 345 the unit employs the M value to update its clock. At step 350 the unit has achieved synchronization and enters the network.

Figure 7D:
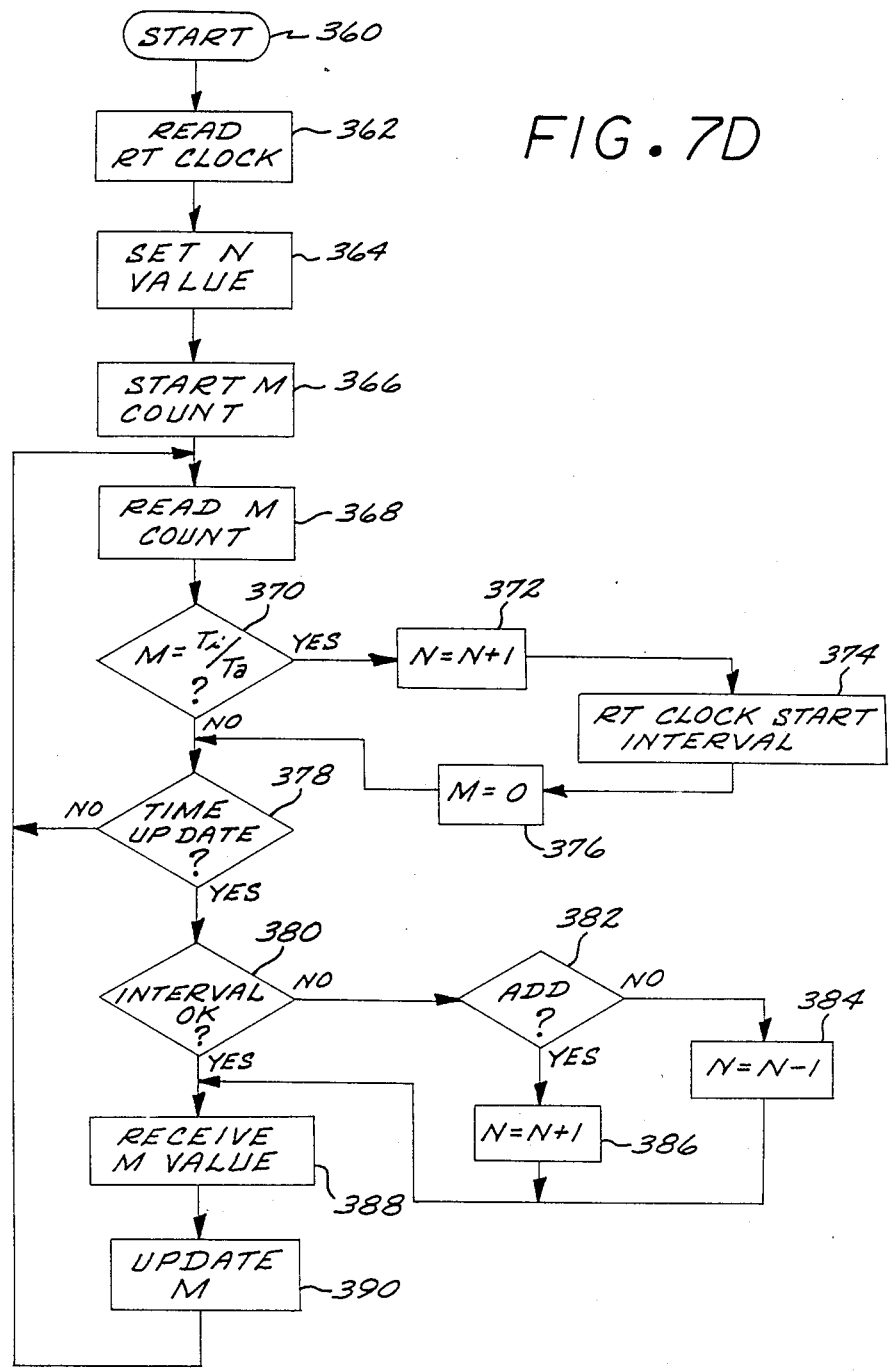

Referring now to FIG. 7d, the operation of a clock device 125 which employs a real time clock, an interval counter for providing an interval count N, and a subinterval timer or counter for providing a subinterval count M. The clock device starts operation at point 360. At step 362 the real time clock is read to determine the relative real time.

At step 364 the real time is processed to determine the corresponding N value. For example, if $T_i$ is one second, the processing may simply be to determine the number of elapsed seconds since some start time, for example, 12:00 a.m. At step 366 the M counter is started from the zero count.

At step 368 the state of the M counter is read. At decision point 360 the current M is compared to $T_i/T_a$ the number of subintervals in each interval. If the comparison is affirmative, a complete interval has elapsed, and at step 372 the interval counter is incremented. At step 374 the real time clock is adjusted so that the real time coincides with an interval transition, and at step 376 the M counter is reset to zero.

If the result of the comparison at step 370 is negative, then at step 378 a decision is performed to determine whether a first network time message has been received by the network unit. if the decision is negative, then the operation branches back to step 368. If the decision at step 378 is affirmative, a decision is performed (step 380) to test whether the unit's message advises that the interval coincides with the network time interval. If not, then the message is tested at step 382 to determine whether the interval should be incremented. If so, the interval counter is incremented at step 386. Otherwise the interval counter is decremented at step 384.

At step 388 the second network time message is received, and the M value is decoded. At step 390 the M counter is updated. The clock operation then branches to step 368.

Figure 8:
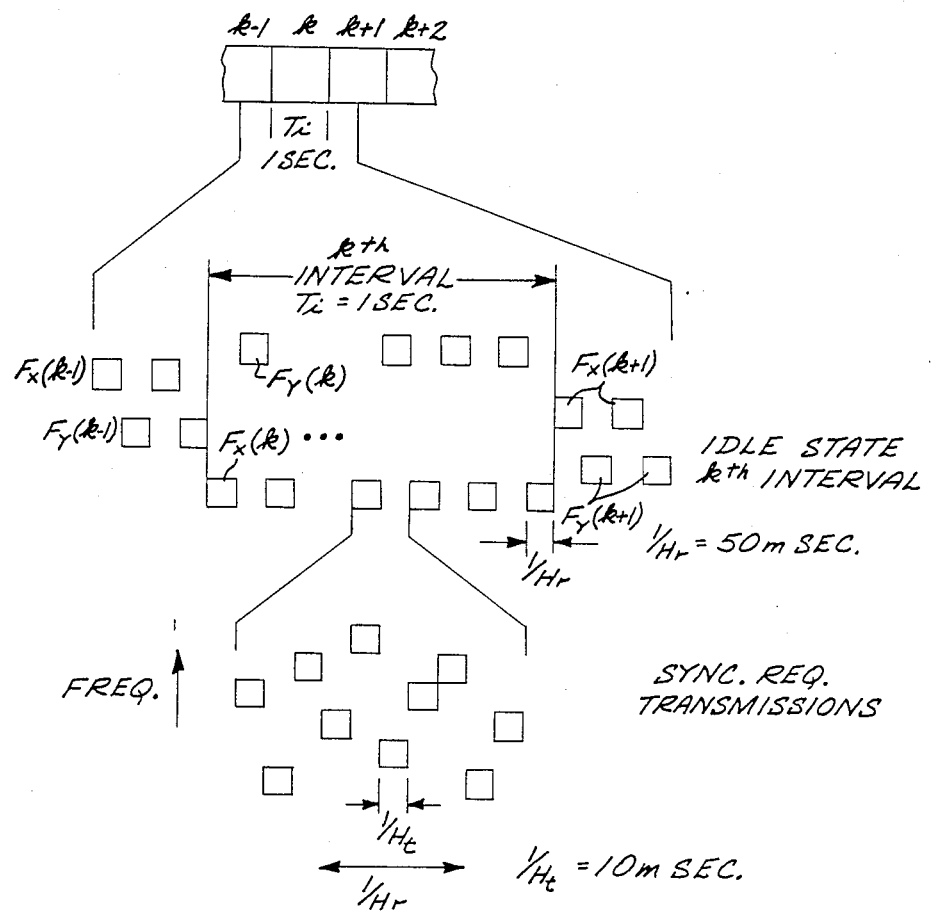
FIG. 8 is a frequency-time chart illustrative of an example of representative numerical parameters of a network example employing the invention.

In order to further illustrate the invention, an example will be presented which allows an unsynchronized network unit having a relative time within plus or minus one second of network time to synchronize to within plus or minus one microsecond of the network time. This set the synchronization time at 140 milliseconds and the maximum receive hop rate of 20 HPS as defined by Eq. 1. For the example, the following parameters are assumed: a time interval duration ($T_i$) of 1 second and a transmit hop rate ($H_t$) of 100 hops per second (HPS). A transmit hop rate ($H_t$) of 100 HPS requires that each synchronization signal at a particular frequency be transmitted in a 10 millisecond period. The interval accuracy ($T_a$) of the network is set at 1 microsecond. A data rate of 8 kbits/second (kBPS) will also be assumed. Certain of these parameters are illustrated in the frequency and time chart of FIG. 8.

M is calculated to be $10^6$ (M is the interval duration $T_i$ divided by the subinterval accuracy $T_a$). Using a binary format, M can be fully defined by 20 bits.

The 10 millisecond synchronization transmission duration can be used to send 80 bits information with the data rate set at 8 kBPS. If 64 bits are used for the respective correlation words, the remaining sixteen bits can be used to transmit the protocol word. One bit is used to identify a first or second transmission sequence set (a redundant transmission set is required to cover all possible transition states that might occur with a one second time uncertainty). Although the relative time uncertainty covers only plus or minus one second, the only relative time information that must be sent is whether the synchronization code $C_k$ used is for the past, present, or future time interval, and two bits will convey that data. Since sixteen bits of information are available to send this information, the three bits can be coded into 16 bits for transmission.

Figure 9:
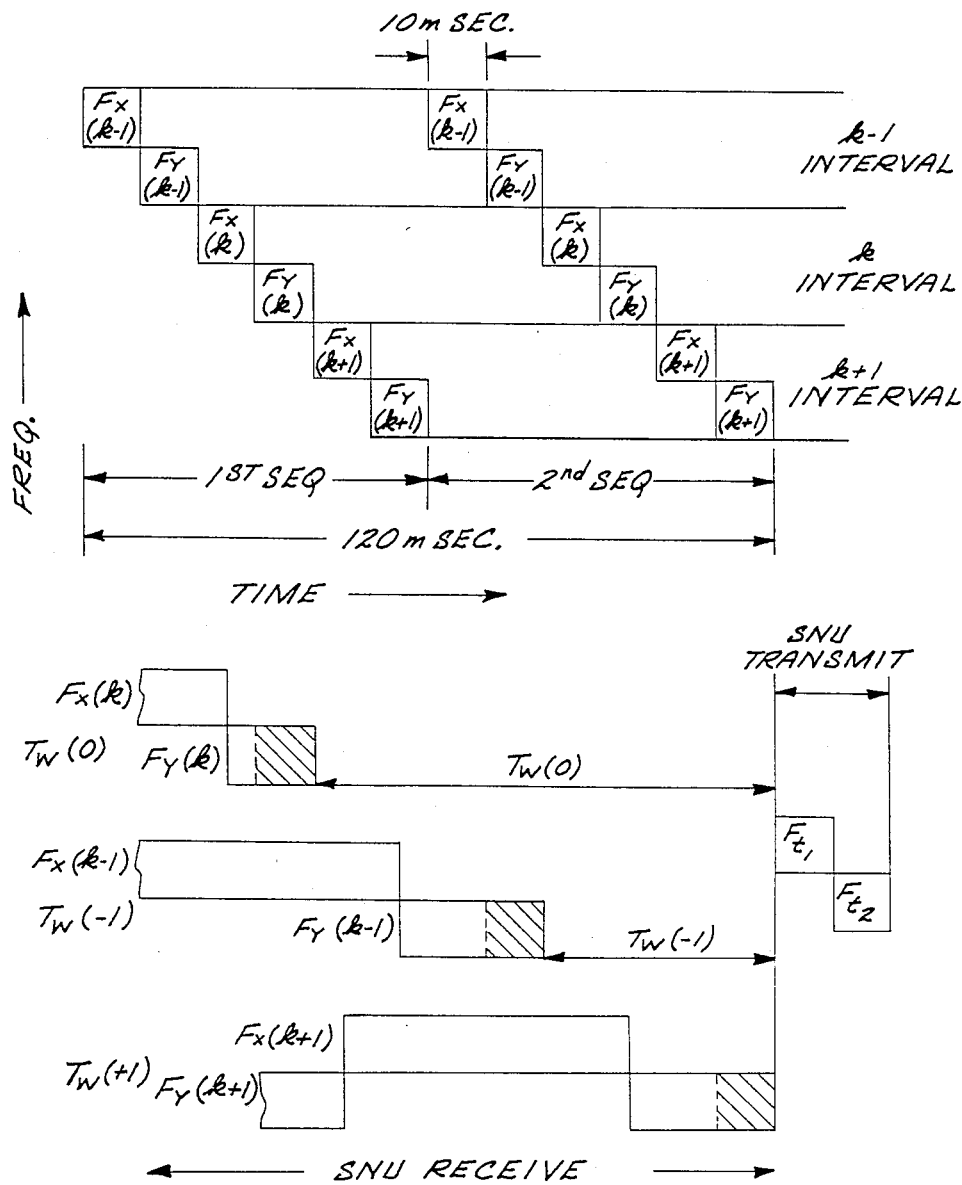
FIG. 9 is a frequency-time chart illustrating a synchronization request from a RTU operating in the demand entry mode, and the time synchronization response by an NTU, for the exemplary example of FIG. 8.

For the demand mode, the transmission sequence for a RTU requesting entry into the network is shown in FIG. 9. The RTU employs its present relative time interval to generate the code $C_k$ for the kth time. Thus, the code for the $k-1$ interval is the relative "past" interval code, and the code for $k+1$ interval is the future interval code. Data defining the sequence number and the appropriate identification of the past, present or future interval are included in the protocol word within each synchronization request message. The two sets of synchronization transmission sequences occur in 120 milliseconds which corresponds to 12 ten millisecond transmissions.

When an NTU has correlated to a RTU synchronization transmission, the protocol word is decoded, and the NTU then responds with the proper network time messages at the end of the RTU request sequences. The NTU computes the time delay $T_w$ between the end of the correlated transmission signal and the end of the two sequences of transmissions by the RTU.

In FIG. 9 three possible time delays $T_w$ are shown as $T_w(0)$, $T_w(-1)$ and $T_w(+1)$. For the illustrated delay $T_w(0)$, the NTU correlates on frequency $F_y(k)$ and determines that the RTU's relative time interval $T_i$ corresponds to the present time interval of the NTU. The NTU knows a priori that there are two sequences of six transmissions, each of 10 milliseconds duration. The NTU decodes the protocol word to determine that the end of the second sequence will occur after eight more messages; i.e., $T_w(0)$ is 80 milliseconds.

For the second illustration of time time delay $T_w(-1)$, the NTU correlates on frequency $F_y(k-1)$ in the second sequence. The NTU determines that the frequency $F_y(k-1)$ is for the past relative interval, and that the second sequence ends four transmissions later; i.e., $T_w(-1)$ is 40 milliseconds.

For the third illustration of the delay $T_w(+1)$, the NTU correlates on frequency $F_y(k+1)$. With the information that the transmission is in the second sequence and at the frequency for the future interval (RTU time), the NTU determines that the second sequence ends after the correlated transmission; i.e., $T_w(+1)=0$.

The NTU waits the appropriate time ($T_w$) and then responds with two network messages which are received by the RTU. The transmit frequency $F_{t1}$ is established by the RTU transmission. This first message is a digital word with 80 bits of information, 64 bits for the time correlation word, and 16 bits used to identify the proper protocol word, i.e. for the past present or future time interval. These 16 bits inform the RTU whether to advance, retard, or maintain its current time interval state.

The second network time message is at frequency $F_{t2}$ as determined by the code $C_j$ for the present network time interval. The second message is also an 80 bit word, defining the value of M, thus providing the RTU with the correct subinterval time. The RTU decodes this data and updates its clock, thus establishing itself into network synchronization.

In this example, the technique has allowed a RTU to change its clock accuracy from plus or minus one second to plus or minus one microsecond with a synchronization duration of only 140 milliseconds. While this example illustrated the demand modes, the RTU could also receive the same information by the broadcast or passive methods described above.

The present invention can be employed as a general technique frequency-hopping network to provide rapid network entry. The technique variables can be modified to handle various transmission data rates, time uncertainties and network limitations.

A method and apparatus has been described for achieving rapid time synchronization between frequency hopping communications devices. Synchronization is achieved without the use of long synchronization preambles and without degradation of the network's antijam performance. The technique can be used to achieve synchronization without requiring transmissions from the unsynchronized unit. In addition, only one transmitter and receiver is employed in a typical network unit, thus eliminating the need for multiple receivers and transmitters heretofore required to achieve an equivalently rapid synchronization using conventional techniques.

Once an RTU has entered a network, it may periodically readjust its relative time via the synchronization technique described above, to ensure that the device time remains in synchronization with the network time.

It is to be noted that, while the invention has been described for a particular application employing time and communication correlation words, the invention may be practiced without the use of such words or the correlators. By use of such features, the integrity of the communication network against surveillance and jamming, as well as its noise immunity, is enhanced. Moreover, the correlation word is employed for conventional bit synchronization purposes, to track out timing errors due to propagation delays. In other applications the synchronization code may specify only the idle state frequencies and the network time transmit frequencies, so that the initial step of correlation to initiate synchronization is eliminated. Instead, the basic condition for initiation of synchronization will be coincidence of the transmit and receive frequencies.

It is understood that the above-described embodiment is merely illustrative of the many possible specific embodiments which can represent principles of the present invention. Numerous and varied other arrange-

What is claimed is:

1. A method for synchronizing one or more first frequency hopping communication devices in a frequency hopping communications network to the network time kept by a second network device, wherein each device includes a clock for keeping a device time and the first device time is accurate to within N $T_i$ seconds of the network time, comprising a sequence of the following steps:

(a) operating the first device in an idle state to receive rf transmissions at a set of receive frequencies and a receive hop rate, wherein the set of frequenices is determined by a synchronization code which is updated every $T_i$ seconds;

(b) operating the second device to transmit a sequence of synchronization messages at respective transmit frequencies with a transmit hop rate, the transmit frequencies selected to comprise a transmit set of all possible idle state receive frequencies within the time uncertainty, each synchronization message comprising information indicating the time and frequency at which the second device will transmit a network time message;

(c) when the first device receives a synchronization message as a result of coincidence of the respective transmit and receive frequencies, processing that synchronization message to predict the time and frequency of said network time message;

(d) operating the second device to transmit said network time message defining the network time to within a predetermined network time accuracy; and (e) operating the first device to receive said network time message at said predicted time and frequency and to adjust its clock in dependence on said message.

2. The method of claim 1 wherein the maximum receive hop rate is selected to be no higher than the transmit hop rate divided by (4N+1).

3. The method of claim 1 further comprising a synchronization demand mode comprising a sequence of the following steps:

(f) operating said second device in said idle state;

(g) operating the first device to transmit a sequence of synchronization request messages at said transmit set of frequencies and said transmit hop rate, each request message comprising information indicating the time and frequency at which a network time message is requested;

(h) when said second device receives a synchronization request message as a result of coincidence of the respective transmit and receive frequencies, processing said request message to predict the time and frequency of the requested time message, and transmit said requested time message; and (i) operating said first device to receive said network time message at said expected time and frequency and adjust its clock in dependence on said messages.

4. The method of claim 3 further comprising a passive mode for synchronizing a third network unit, comprising a sequence of the following steps:

(j) operating said third unit in said idle state;

(k) in the event of reception of a synchronization request message from said first device, processing said message to predict the expected time and frequency of a network time message transmitted by said second device; and (l) operating said third device to received said network time message at said predicted time and frequency and to adjust its clock in dependence on said message.

5. The method of claim 1 further comprising the step of generating said synchronization code every $T_i$ seconds, said synchronization code comprising a sequence of digital bits defining said set of receive and transmit frequencies.

6. The method of claim 5 wherein the step of generating said synchronization code comprises the calculation of a pseudorandom bit sequence by an arithmetic process, wherein one parameter in the calculation is a time value.

7. The method of claim 1 wherein step (c) further includes operating the second device to transmit a redundant sequence of synchronization messages.

8. The method of claim 1 further comprising a communication mode, comprising the following steps:

(f) when the clock of the first device has been synchronized to the network time, operating one of said devices to transmit a sequence of communications messages at respective communication frequencies defined by a communication code known at the respective first and second devices, at said transmit hop rate, and (g) operating the other of said devices to receive at the rspective communication frequencies defined by said communication code and at the transmit hop rate to receive said communications messages.

9. The method of claim 1 wherein each of said respective synchronization messages comprises a protocol digital word defining the location of the respective synchronization message in said sequence and the respective code defining the respective idle state frequency at which the message is transmitted.

10. The method of claim 9 wherein said processing of the synchronization message carried out in step (c) comprises the prediction of the time at which said message sequence will end, and the determination from the respective code information, of that code defining the frequency of said network time message.

11. A method of synchronizing a first frequency hopping device to a second frequency hopping device, comprising a sequence of the following steps:

(a) providing each device with an interval clock means for counting the number N of elapsed time intervals of duration $T_i$ from a start time, and a subinterval clock means for counting the number M of elapsed subintervals of duration $T_a$ within a given interval;

(b) generating a synchronization code comprising a sequence of digital bits in dependence on the current state of the interval counter for each respective device, said code defining respectively a time correlation word, a set of idle state frequencies and a set of transmit frequencies;

(c) operating the first device in an idle state to alternately receive on said idle state frequencies at a receive hop rate and to perform a correlation function between any received signal and the correlation word defined by the code for the present N value of the interval timer;

(d) operating the second device to transmit a sequence of synchronization messages on a transmit set of all possible idle state frequencies defined by the respective codes within a maximum relative time uncertainty between the current interval state of the respective clocks for each device, each synchronization message comprising the respective correlation word defined by the respective code and information indicating the time and frequency at which the second device will transmit a network time message;

(e) when the correlation is achieved between a signal received by said first device and the respective correlation word, operating the first device to predict the time and frequency of said network time message;

(f) operating the second device to transmit a network time message defining the M and N values representing the network time; and (g) operating the first device to receive said network time message and adjust its N and M counters in dependence on said message to synchronize to the time kept by the second device.

12. The method of claim 11 wherein said respective codes further define a communication correlation word, and wherein said method further comprises a communication mode comprising a sequence of the following steps:

(h) once synchronization has been achieved, operating a respective one of said devices in said idle state;

(i) operating the other of said devices to generate a sequence of communication initiation message at the network hop rate, one of said messages at the corresponding idle state frequency, each initiation message comprising said communication correlation word and information indicating the time at which communication messages will be transmitted;

(j) operating the respective devices at frequency hopping frequencies defined by said code in dependence on the states of the interval and subinterval counters to respectively transmit and receive communication messages at the transmit hop rate.

13. A frequency hopping communication device, comprising:

a transceiver adapted to receive an rf signal modulated with digital data at a receive frequency determined by a frequency receive control signal, the transceiver being further adapted to transmit of an input signal modulated with digital data at an rf transmit frequency determined by a transmit control signal;

a demodulator coupled to said transceiver to demodulate the received signal into a digital bit stream;

a modulator coupled to said transceiver and arranged to provide said input signal to said transceiver;

a frequency generator coupled to said transceiver for providing said transmit and receive frequency control words to said transceiver in dependence on a frequency generator control word; and a digital processor comprising:
a clock element for providing a time signal
a correlator element coupled to said demodulator for correlating said digital bit stream with a correlation word and providing a decoder signal indicative of the correlation result;
a code generator coupled to said clock element for generating a unique digital code sequence in dependence on the state of said time signal;
digital memory element having an input coupled to said code generator for storing sequentially generated ones of said code sequences, and an output coupled to said frequency generator, said modulator and said correlator for providing at said output a particular one of said codes in dependence on the state of a memory control signal; and a synchronizer processor coupled to said correlator, clock and memory elements, said synchronizer processor responsive to said decoder signals for generating a clock control signal for advancing or retarding said clock state and for generating said memory control signal to determine the particular code to be provided as an output of said memory device in dependence on received network time messages.

14. A method of synchronizing a first frequency hopping communication device to a second frequency hopping device, wherein the first and second devices are adapted for frequency hopping communication over a time period T, comprising a sequence of the following steps:

a. dividing the time T into N coarse time intervals, wherein the duration $T_i$ of a coarse time interval is T/N;

b. dividing each coarse interval into M subintervals of duration $T_a$, werein $M = T_i/T_a$.

c. providing each device with a clock means for keeping a device time, wherein the respective times kept by each clock means are accurate to with $T_i$ seconds of the time kept by the other device;

d. providing a synchronization code for use during each time interval, said code defining respectively a correlation word, a set of receive frequencies and a time transmit frequency for use during the respective time interval;

e. operating the first device in an idle state to receive on an alternating plurality of receive frequencies at a receive hop rate defining a receive dwell time and to perform a correlation function between a received message and the correlation word comprising the synchronization code corresponding to a particular time interval $T_i$;

f. operating the second device to transmit a sequence of synchronization messages on respective ones of the receive frequenices defined by the respective codes for the past, present and future time intervals in relation to the time kept by the second device, each message comprising the correlation word defined by said respective code and information indicative of its relative location in the sequence of messages and the relation of said respective code to the current second device code, the messages occurring at a transmit hop rate which is higher than the receive hop rate;

f. operating the first device in said idle state until correlation is achieved between a received message and a correlation word;

g. preparing the first device to receive a time message at a time and frequency predicted by processing said relative location information;

h. operating the second device to transmit a time message after transmission of said sequence at a said time transmit frequency, the time message comprising data defining the time interval $T_i$ and subinterval $T_a$ to which the time kept by the first device should be set; and i. operating the first device to receive said messsage and adjust its clock to the time interval and subinterval indicated by the time message.

15. The method of claim 14 wherein the maximum receive hop rate is selected to be no higher than the transmit hop rate indicated by the quantity (4N+1).

* * * * *

UNITED STATES PATENT AND TRADEMARK OFFICE
CERTIFICATE OF CORRECTION

PATENT NO. : 4,677,617

DATED : June 30, 1987

INVENTOR(S) : R. J. O'Connor, et al.

It is certified that error appears in the above-identified patent and that said Letters Patent is hereby corrected as shown below:

Column 4, line 63, replace "prices" with --provides--.

Column 8, line 14, replace "NUT" with --NTU--.

Column 8, line 51, replace "NUT's" with --NTU's--.

Column 11, line 45, replace "if" with --is--.

Column 11, line 61, between "output" and "modulator" please insert --by storage element 120 to the frequency generator 150, the--.

Column 15, line 32, please replace "time" with --interval--.

Column 16, line 5, between "is" and "established" please insert --selected by use of the RTU time reference which was--.

Signed and Sealed this

Sixth Day of February, 1990

Attest:

JEFFREY M. SAMUELS

Attesting Officer     Acting Commissioner of Patents and Trademarks